Oct. 8, 1963        J. V. BORDEN        3,106,021

CONTROL UNIT FOR DENTAL HANDPIECES

Filed June 18, 1957        4 Sheets-Sheet 1

INVENTOR.
JOHN V. BORDEN
BY
ATTORNEY

Oct. 8, 1963     J. V. BORDEN     3,106,021
CONTROL UNIT FOR DENTAL HANDPIECES
Filed June 18, 1957     4 Sheets-Sheet 2

*INVENTOR.*
JOHN V. BORDEN
BY
ATTORNEY

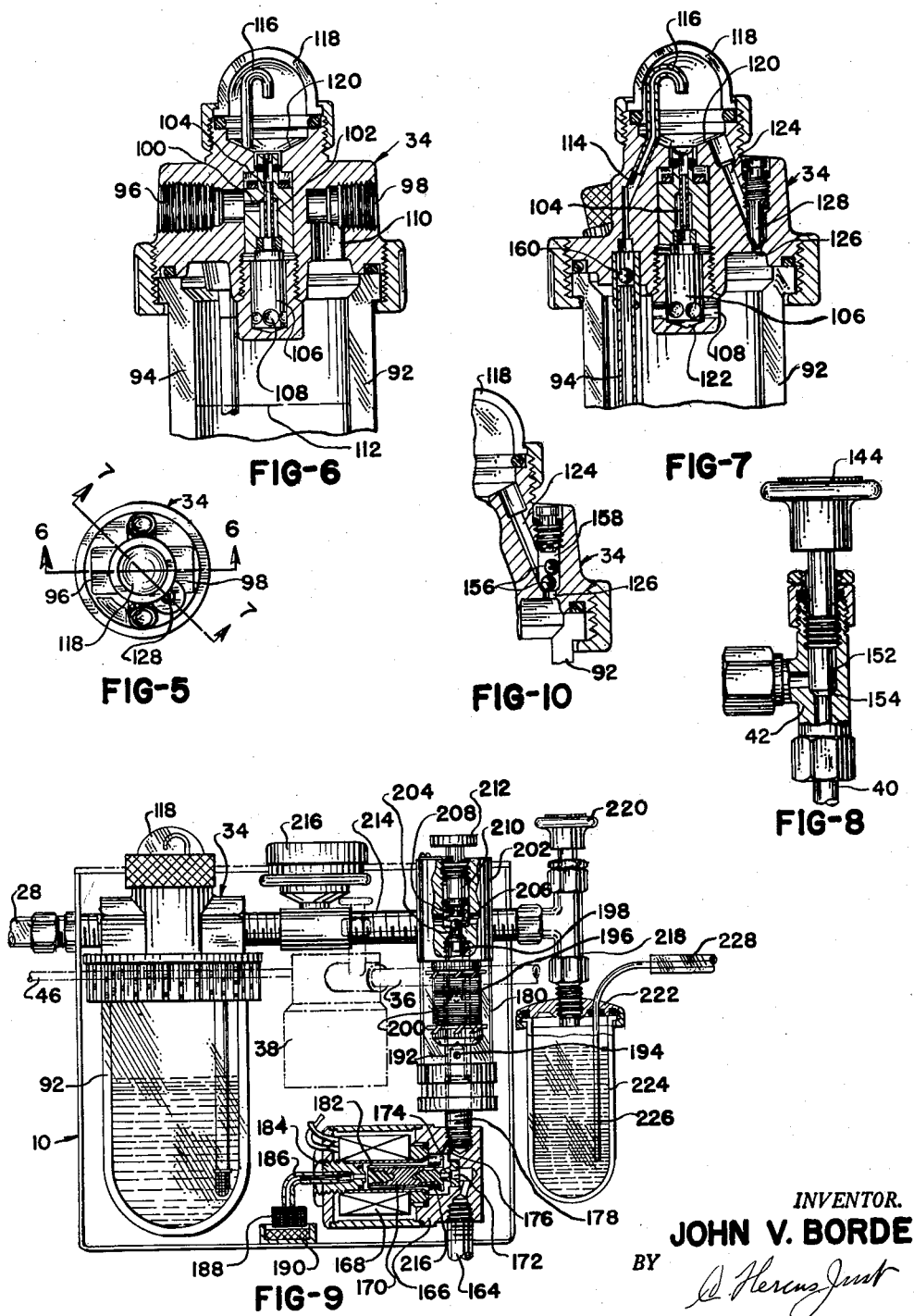

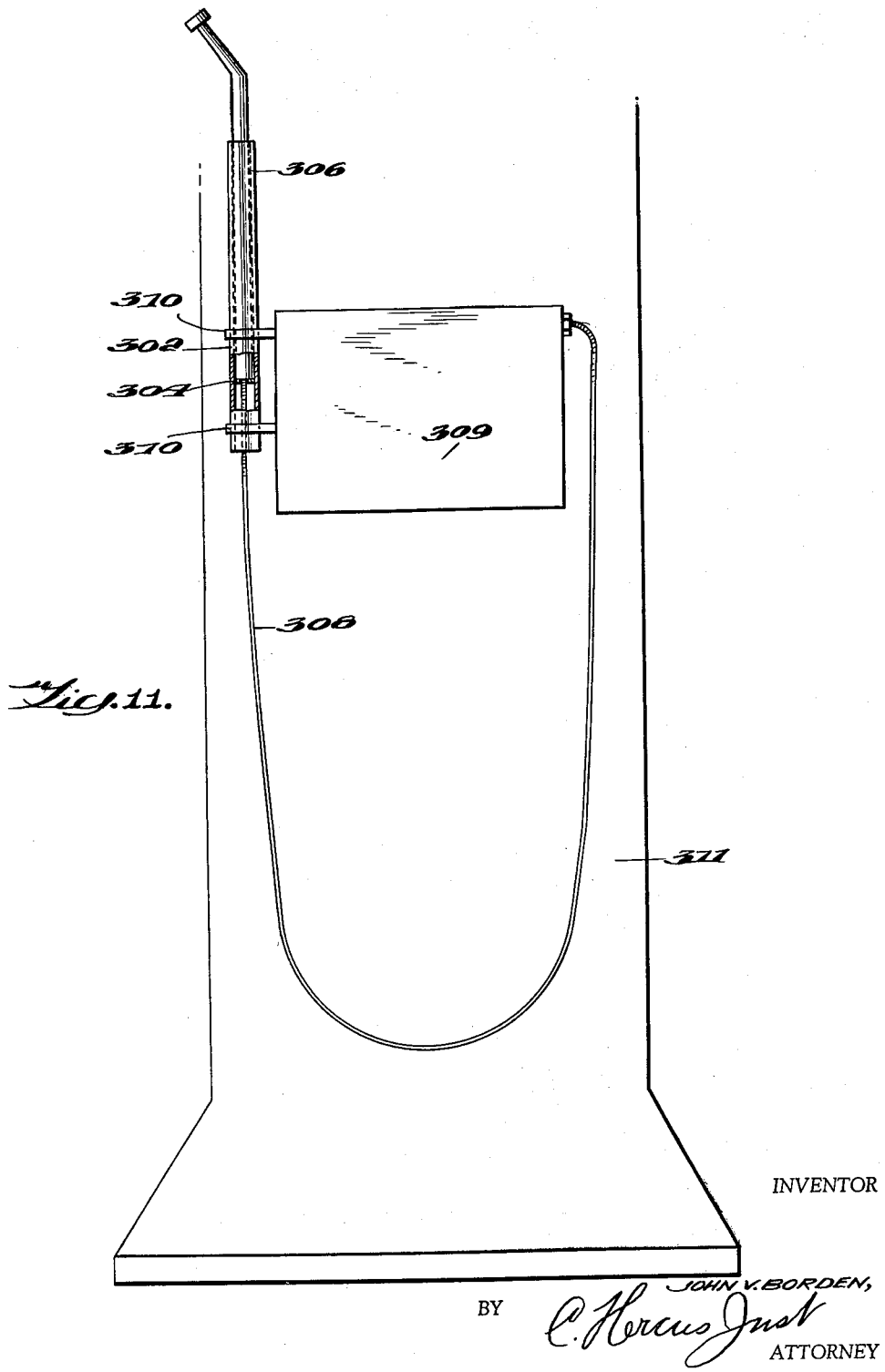

United States Patent Office 3,106,021
Patented Oct. 8, 1963

3,106,021
CONTROL UNIT FOR DENTAL HANDPIECES
John V. Borden, 1711 31st St. SE., Washington, D.C.
Filed June 18, 1957, Ser. No. 666,454
16 Claims. (Cl. 32—28)

This invention relates to improvements in control units for dental handpieces and, more particularly, to control units for use in connection with dental handpieces employing a turbine in the head of the handpiece which is driven by air or other gaseous fluid. One example of this type of dental handpiece is described and claimed in co-pending application, Serial No. 634,860, filed January 18, 1957, and now abandoned.

The present trend in the development of handpieces is in the direction of very high speeds. For many years, conventional dental handpieces have been made and used for operation at speeds of the order between 5,000 and 10,000 r.p.m. These handpieces were driven by systems of belts and, where a contra-angle handpiece was employed, shafts connected by bevel gears and the like were employed to rotate the chuck holding the bur. In very recent years, attempts have been made to increase the speeds of handpieces of these types by certain forms of gear and belt type mechanisms which increase the speed of the bur of the handpiece a limited number of times over the normal speed thereof. Even with such increase in speed however such handpieces have certain outstanding deficiencies and undesirable characteristics.

To improve cutting efficiency of dental burs, it is common practice at present to employ so-called carbide burs, as well as diamond burs. Particularly in regard to carbide burs however, it is known that these do not reach their highest cutting efficiency until the speed of the average size of carbide bur attains approximately 400,000 r.p.m. In order to attempt to approach this speed, the present inventor decided to depart from conventional mechanical practices employed heretofore in handpieces and, as is evidenced by the invention set forth in his co-pending application identified above, developed a handpiece with a very minimum number of moving parts, all of these being concentrated in the head of the handpiece wherein a vaned turbine rotor, mounted in a pair of anti-friction bearings at opposite ends thereof, and driven by gaseous fluid such as air, comprise the only moving parts of the handpiece.

The use of air as the driving medium for the turbine is particularly advantageous in that should a break occur in the supply line, no disadvantages are experienced as compared with the use of a liquid fluid driving medium. However, particularly for purposes of maintaining the overall size of the head of the handpiece within acceptably small dimensional limits, it is necessary to employ correspondingly small anti-friction bearings. In an attempt to produce such a handpiece originally, it was found that normal commercial small sized anti-friction bearings such as were required were not recommended by the manufacturers for operation at the contemplated speeds. This problem was solved successfully by providing unique construction in the head of the handpiece by which said bearings are both cooled and lubricated satisfactorily to sustain relatively long life at speeds as high as 200,000 r.p.m., for example, for normal operating periods employed during the use of handpieces by dentists and other operators.

When it is considered that the overall dimensions of the head of a handpiece of this type has a diameter of the order of ⅜ of an inch, and an axial dimension of the order of ½ inch, it will be appreciated that anti-friction bearings of the type employing both inner and outer races, with balls therebetween, must be small. For example, the outer diameter of the outer race of bearings which have been employed successfully is ¼ inch. The bore of the inner race for example is ⅛ inch. One standard type of bearing of this range of size employs fifteen balls of one mm. disposed between the races of the bearing. Hence, these balls are substantially ¹⁄₂₅ inch in diameter and a radial tolerance between .0002 and .0005 inch between the two races with the balls mounted therein is provided. Such tolerance obviously is very small, whereby it is essential that no grit, dirt, or other extraneous matter be introduced into the turbine with the air or other gaseous fluid used to drive it.

Further, primarily for expediency and simplification, the lubricant which is furnished to the anti-friction members is introduced with the gaseous driving medium, preferably in the form of a mist or fog, whereby as the gaseous fluid discharges simultaneously from opposite ends of the vanes of the rotor, at least a certain portion of the gaseous medium is directed immediately onto the anti-friction members, and particularly the rotating balls thereof. Thus, not only is lubrication afforded the bearings but the discharging gaseous medium passes through the space between the races of the bearings and thereby serves to cool the bearing races and the balls therebetween.

Modern dental practices also utilize a water spray or jet adjacent the bur of the handpiece, whereby drilling operations may be cooled, particularly for purposes of affording comfort to the patient. Further, the supply of water to the bur while drilling flushes the chips from the cavity being drilled by the bur. While a number of attachments now are available for application to conventional dental handpieces for purposes of supplying water for the above described purposes, the handpiece illustrated in the aforementioned co-pending application, Serial No. 634,860, contemplates the provision of water delivery tubes directly in the handpiece with the outlet opening being positioned adjacent the bur so as to deliver a stream of water directly onto the cutting end of the bur.

It is the principal object of the present invention to provide a control unit which preferably supplies both gaseous fluid such as air to drive the turbine, and water to the head of the handpiece so as to be directed against the bur while operating. Such control unit also includes means for regulating the supply of gaseous fluid such as air at a predetermined desired pressure below that of the line pressure supplied to the control unit, and filter means for the gaseous fluid also are included to insure the supply of gaseous fluid to the turbine of the handpiece in clean condition and free from extraneous material. Means for introducing preferably a mist or fog of liquid lubricant into the gaseous fluid also are included in the unit, whereby the gaseous fluid supplied to the turbine not only drives the turbine but also affords lubricant for the bearing units thereof.

Another object of the invention is to provide, in the preferred embodiment of the invention, solenoid actuated valves for controlling the supply of both the gaseous fluid and water to the handpiece from the unit, said solenoid actuated valves preferably being controlled remotely by switch mechanisms located at any convenient place to the dentist or other operator, such as on the floor adjacent the operating chair, whereby said switches may be actuated by the dentists' feet and his hands are left free for operating the handpiece, holding a dental mirror, and the like.

Still another object of the invention is to provide in the preferred embodiment of the invention, filter means for the gaseous fluid which include readily operable means for discharging accumulated extraneous material periodically from the filter after the same has been separated from the stream of gaseous fluid passing through the filter prior to being delivered to the handpiece.

Details of the foregoing objects and of the invention, as well as other objects thereof, are set forth in the following specification and illustrated in the accompanying drawings comprising part thereof.

In the drawings:

FIG. 5 is a top plan view of the lubricating means included in the unit according to the invention.

FIG. 6 is a vertical sectional view of the lubricating means taken on the line 6—6 of FIG. 5.

FIG. 7 is another vertical sectional view of the lubricating means taken on the line 7—7 of FIG. 5 and illustrating details thereof not viewable in FIG. 6.

FIG. 8 is a vertical sectional view of a control valve for the water supply as used in the unit in accordance with the invention.

FIG. 9 is a vertical sectional view similar to FIG. 2 but showing a somewhat different embodiment of a control unit which is somewhat more simple than the unit shown in FIG. 2.

FIG. 10 is a fragmentary sectional view of the details of another embodiment of lubricant flow control mechanism for the lubricator.

FIG. 11 is a side elevation of a hanger for a handpiece attached to the housing for the control unit and comprising an additional embodiment of means to hold the handpiece, when not in use, from that shown in FIG. 1.

The accompanying drawings illustrate several exemplary embodiments of the present invention comprising a control unit for dental handpieces, it being understood that the specific illustrations included in the various views of the drawings are not to be regarded as restrictive but primarily as illustrative.

Figures 1, 2:
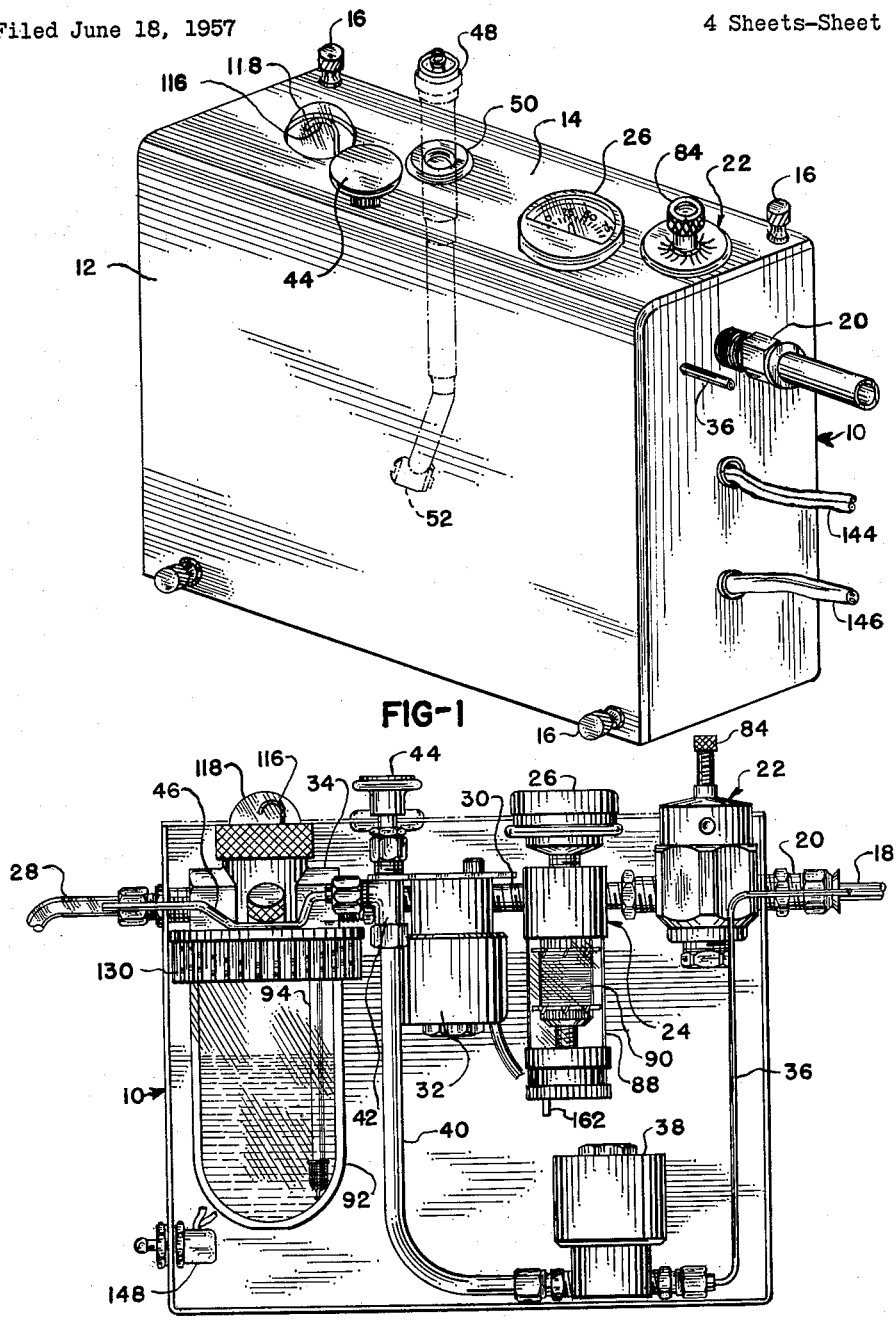
FIG. 1 is a perspective view of an exemplary housing enclosing a control unit embodying the principles of the present invention, said figure showing, in phantom, an exemplary handpiece disposed in inoperative position therein.
FIG. 2 is a vertical sectional view of the control unit shown in FIG. 1.

Referring to FIGS. 1 and 2, a suitable casing 10 encloses the various components of the control unit of the invention, particularly where such control unit is to be attached to an existing dental stand adjacent a dental operating chair for example. However, in regard to incorporating a control unit of this type in newly designed dental stands, it will be understood that a suitable compartment may be provided in the dental stand per se for accommodating the various elements of the control unit in accordance with the principles of the present invention. If desired, the casing 10 may be formed so as to include a movable cover 12 having a top plate 14, said cover and top plate preferably being integral and secured to the casing 10 by any suitable means such as thumb screws 16. For ease of mounting and removing the cover and top plate from the casing 10, the top plate has a plurality of apertures therein through which various elements of the control unit project such as operating knobs and the like, details of which are described hereinafter.

Figure 3:
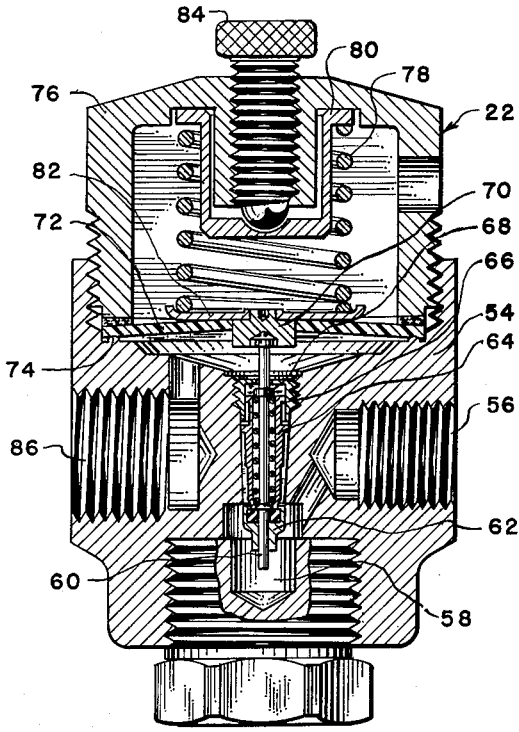
FIG. 3 is a vertical sectional view, on a larger scale than employed in FIG. 2, of the adjustable control valve for the gaseous fluid, said valve comprising a component of the unit shown in FIGS. 1 and 2.

Exemplary details of the various components of the control unit of the invention are best shown in FIG. 2. It will be seen that the inlet line 18 for the gaseous fluid leads from a suitable source of supply such as a compressed air tank commonly used to furnish air pressure to various instruments in a dental office. Said line connects to a nipple 20 connected to the inlet end of control valve 22. The specific embodiment of control valve illustrated in FIG. 2 is shown in an enlarged sectional view in FIG. 3, details of which will be described hereinafter. Gaseous fluid is delivered from the control valve to the inlet end of a filter 24 which may be any one of a number of suitable types, details of certain essential characteristics of which are set forth in greater detail hereinafter.

The filter 24 preferably is surmounted by a pressure gauge 26 which indicates the so-called back pressure within the control unit which corresponds to the pressure delivered from the delivery tube 28 of the control unit to a dental handpiece. The delivery end of the filter 24 is connected by a nipple 30 to a solenoid-actuated delivery valve 32, the outlet port of which is connected by another nipple to the inlet end of a lubricator 34, details of which are shown on a larger scale in FIGS. 6 and 7. For purposes of furnishing water, preferably at predetermined pressure, to the dental handpiece, the control unit also has a water inlet conduit 36 which is connected to a suitable source of water supply. The conduit 36 is connected to the inlet end of a solenoid-actuated water control valve 38. Connecting conduit 40 leads from the delivery end of valve 38 to a regulating valve 42 provided with an adjusting knob 44 by which the valve is regulated to supply water at a desired amount and pressure to the delivery conduit 46 to which a flexible water conduit is connected to delivery of water to the handpiece 48 illustrated in phantom in FIG. 1.

When the handpiece is not in use, it should be held in a safe manner so that no damage will occur to it. Accordingly, the casing 10 and particularly the top plate 14 thereof may be provided with an opening surrounded by a rubber grommet 50, for example, of sufficient diameter to readily accommodate the head 52 of the handpiece which is suspended freely within the interior of casing 10 and from which the handpiece readily may be withdrawn when it is to be used.

Without limitation thereto, the handpiece 40, which has a gaseous operated turbine in the head 52 thereof, preferably is actuated by a gaseous fluid such as air supplied at relatively low pressure. The offices of most dentists are supplied with air at pressures in excess of twenty pounds. Hence, in the embodiment of the invention shown in FIGS. 1 through 8, the regulating valve 22 is of the type shown in detail in FIG. 3. Said valve has a body 54 provided with an inlet port 56 communicating with a central axial cavity 58 in which a valve shaft 60 is axially movable. Said shaft has a valve member 62 fixed to one end thereof for cooperation with a sleeve-like valve seat 64 fixedly positioned relative to body 54. The interior of valve seat 64 accommodates a spring 66 of very light force which cooperates with a fixed collar 68 on valve shaft 60 so as normally to hold the valve member 62 in closed position against the lower end of valve seat 64.

The upper end of valve shaft 60 is connected to a member 70 which is fixed centrally to a flexible diaphragm 72, the perimeter of which is secured against the seat 74 within body 54 by a hollow threaded cap 76 which is screwed into the body 54 against the diaphragm 72.

The threaded cap 76 encloses a compression spring 78 which extends between a thimble 80 and a disc 82 which abuts the upper surface of diaphragm 72 and is fixed to member 70. Threaded through the top of hollow threaded cap 76 is an adjusting thumb screw 84, the inner end of which abuts the interior of thimble 80 whereby when the screw 84 is threaded inwardly, it moves the thimble 80 so as to compress the spring against disc 82 which correspondingly will exert greater pressure upon diaphragm 72.

Control valve 22 is provided with an outlet port 86, through which gaseous fluid under a desired regulated pressure is delivered to the system embodying the other elements of the control unit within the casing 10, details of which are to be described hereinafter. Assuming however that it is desired to operate a handpiece at a specified pressure such as twenty pounds, which will be indicated upon gauge 26, said pressure will respond, somewhat as back pressure, against the inner surface of diaphragm 72. The pressure of spring 78 will be adjusted so that the valve member 62 will be held open by spring 78 against such back pressure acting upon diaphragm 72. Should said back pressure exceed the desired operating pressure for any cause whatever, the valve member 62 will close until said back pressure is reduced through operation of the handpiece until the desired pressure within the system is resumed, whereupon spring 78 will act to open valve member 62, regardless of the line pressure entering the control valve. Notwithstanding the fact that the line pressure usually will exceed the pressure in the system, the small diameter of the valve member 62, in comparison with the far greater area of the diaphragm 72, will insure the operation of the control valve in the manner described above.

The filter 24 is of the type which receives gaseous fluid from control valve 22 at a predetermined, adjusted pressure of the desired amount and said gaseous fluid enters the interior of casing 88 of the filter, whereby said gaseous fluid percolates through a cylindrical filter medium 90 which may be any one of a number of available commercial types. The interior of the filter medium 90 communicates with the pressure gauge 26 and also with outlet nipple 30 so as to conduct filtered gaseous fluid to the solenoid-actuated delivery valve 32, the pressure of said filtered fluid also reacting against gauge 26 which will visibly indicate the amount of such pressure. Solenoid-actuated delivery valve 32 is of a standard commercial type controlled by a switch included in the circuit of the control unit, details of which are described hereinafter. The delivery end of said delivery valve 32 communicates with the inlet port of the lubricator 34, details of which are shown in FIGS. 5 through 7. Said lubricator preferably is of the type which aspirates liquid lubricant, a supply of which is held within container 92. Further, the entering gaseous fluid, under the pressure indicated by gauge 26, engages the upper surface of the lubricant in container 92, thereby exerting enough pressure to at least partially force some of the lubricant through the up-take 94 of the lubricator 34.

Referring to FIGS. 6 and 7, the lubricator 34 is shown in sectional view to illustrate details thereof to better advantage than shown in FIG. 2. In regard to FIGS. 6 and 7 however, these figures are reversed to the illustration shown in FIG. 2, whereby in FIG. 6, the inlet port 96 is shown on the left-hand side of the figure, while in FIG. 2, it will be on the right-hand side. Correspondingly, the outlet port 98 in FIG. 6 is on the right-hand side, while in FIG. 2, it will be on the left-hand side of the lubricator. Referring now to FIG. 6, when the solenoid-actuated delivery valve 32 is open, gaseous fluid such as air will enter the lubricator 34 through port 96 and will pass through a small orifice 100 into a vertical chamber 102, passing down said chamber past the lower end of suction tube 104 and into the interior of lower chamber 106 which has a plurality of radial ports 108 opening into the interior of container 92. Inasmuch as the gaseous fluid will be under pressure of a range, for example, between 20 and 30 pounds, depending upon the setting of the control valve 22, said gaseous fluid will pass from container 92 upwardly through the up-take hole 110 which communicates with outlet port 98.

Due to the fact that liquid lubricant is contained in container 92 at a certain level indicated by level line 112, the gaseous fluid under pressure will at least partially force some of the liquid lubricant through the up-take 94 and through interior passage 114 so as to be discharged through the end of gooseneck 116 within a preferably transparent dome 118. Further, the downward passage of the gaseous fluid through the vertical chamber 102 past the lower end of suction tube 104 will cause an aspirating effect upon the drops of lubricant discharging from gooseneck 116 into the well 120. The upper end of suction tube 104 communicates with the bottom of well 120 and the suction produced by the passage of the gaseous fluid past the end of suction tube 104 will cause a positive gradual withdrawal of lubricant, in droplet form, from the lower end of suction tube 104. Said oil will drop against the lower end 122, see FIG. 7, of chamber 106 which will cause the droplets to disburse to the extent that at least certain of them are atomized, whereupon the gaseous fluid exiting through radial ports 108 will become entrained with the atomized lubricant and carry the same into the upper interior portion of container 92, from which the lubricant entrained gaseous fluid will exit through outlet port 98 and into delivery tube 28, to be furnished to the handpiece connected thereto.

In accordance with the operation of the lubricator 34, only a certain number of the drops of lubricant hitting the lower end 122 of lower chamber 106 will be atomized, whereas other droplets will remain in droplet form and will be discharged through ports 108 as such and fall into the reservoir of lubricant in container 92. Further, under certain operations of the lubricator 34, somewhat of an excess of lubricant may accumulate within the well 120 and, referring to FIG. 7, at least some of this excess will drain through passage 124 to outlet port 126, from which the lubricant will drop by gravity into the reservoir thereof in container 92, depending upon the setting of a needle valve 128, the upper end of which may be operated by any suitable means such as an Allen wrench.

The setting of the needle valve 128 also will control the amount of suction produced within the dome 118, due to the pressure of the gaseous fluid within container 92 being able to enter outlet port 126 if the opening is sufficiently great to permit said pressure to overcome the viscosity of the liquid lubricant flowing through port 126. Such arrangement will produce any tendency for the lubricant to flood the well 120 for example whereby, if flooding existed, there would be a tendency for an excess of drops of the lubricant to be discharged from the lower end of suction tube 104. Hence, it will be seen that the regulation of needle valve 128 is desirable in order to provide the gaseous fluid discharged from the outlet port 98 being entrained with a desirable amount of liquid lubricant. Further, with a slight amount of practice, a dentist for example readily can become familiar with the approximate amount of lubricant to be discharged from the end of gooseneck 116 by observing the dome 118, particularly since the dome projects through the top plate 14 of the cover of casing 10 as is clearly evident from FIG. 1.

In order to control the entrance of gaseous fluid from the supply line to the unit, it is preferred that the delivery valve 32 be placed preferably in the system ahead of the inlet port 96 of the lubricator 34. Thus, when it is desired to fill the container 92 with lubricant for example, it is merely necessary to remove cover 12, unscrew clamping ring 130, and remove the container 92 from the unit, whereupon it readily may be filled to a desired level and then re-mounted in operative position. While this is occurring, there will be no gaseous fluid under pressure being introduced into the lubricator 34 due to the desired position of the delivery valve 32 as aforesaid.

Figure 4:
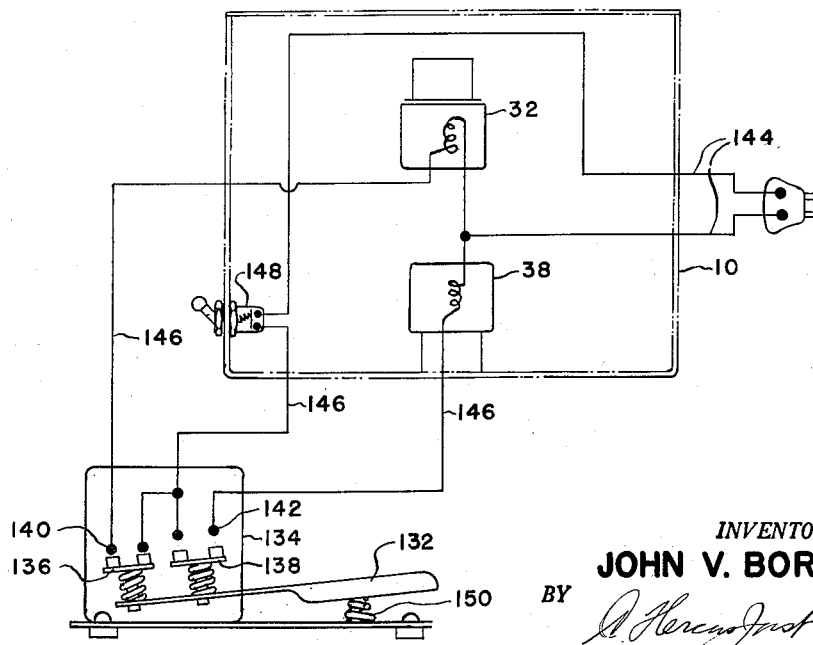
FIG. 4 is an exemplary wiring diagram of the circuit employed in the control unit in accordance with the invention.

When the control unit is in operation however, and it is desired to operate the handpiece 48, the operator such as a dentist will actuate delivery valve 32, which is solenoid-actuated, by pressing upon foot treadle 132 for example of switch unit 134, as will be seen from FIG. 4. In the exemplary illustration of FIG. 4, the foot treadle 132 is shown to have on one end thereof a pair of switch bridging elements 136 and 138. These respectively engage and bridge the switch contacts 140 and 142 which respectively control the solenoids of delivery valve 32 and water control valve 38.

It also will be understood that the unit will be provided with a two-wire electric power conduit 144 which enters the casing 10 as shown in FIG. 1, the same being connected in circuit with the switch contacts 140 and 142 as shown in FIG. 4. Also, a three-wire electric conduit 146 leads from the casing 10 to the switch unit 134. It is to be understood however that the exemplary switch unit 134 illustrated herein is purely exemplary and not restrictive. Also, other necessary circuit wires between the solenoids and switch contacts are shown in FIG 4, as well as circuit wires to a master switch 148 for the entire circuit.

When the foot treadle 132, for example, is depressed by the operator, the bridging element 136 will close the circuit between contacts 140 of delivery valve 32, thereby permitting gaseous fluid to flow from regulating valve 22, through the filter 24, into lubricator 34, and thereby be delivered to delivery tube 28 to the handpiece, resulting in operation of the turbine rotor in the head 52 of the handpiece. It will be understood of course that, in the embodiment shown in FIGS. 1 through 4, it may be desirable only to operate the handpiece to drive the bur therein, without requiring the application of water against the bur. Under such circumstances, the foot treadle 132 is only partially depressed so as only to close the circuit through the contacts 140. However, if water is also desired to be delivered to the bur of the handpiece, then the foot treadle 132 is pressed further so as to dispose the bridging element 38 across the switch contacts 142, thereby closing the circuit of water control valve 38, whereby water from supply conduit 36 will be delivered to water delivery conduit 46, through which it passes to the head 52 of the handpiece. If water delivery to the handpiece no longer is necessary but continued operation of the handpiece is desired, it is only necessary for the operator to slightly elevate the foot treadle by means of spring 150 for example, thereby opening the switch contacts 142, while the switch contacts 140 remain closed by bridging element 136.

When the foot treadle 132 has been depressed sufficiently to close switch contacts 142 so as to effect delivery of water to the handpiece, the amount of water delivered can be controlled by regulating valve 42, details of an exemplary form of which are shown in FIG. 8. For simplicity, the valve 42 merely may comprise a needle valve having a threaded needle member 152 engageable with a seat 154, the needle being regulated by knob 44. For convenience, the knob 44 is disposed above the top plate 14 of the casing for ready access to the operator. Likewise, the thumb operated adjusting screw 84 of control valve 22 projects above the top plate 14 of the casing as is clearly shown in FIG. 1.

Referring to FIG. 10, a modified construction detail is illustrated in regard to lubricator 34. This further embodiment comprises only the control of the discharge of liquid lubricant through passage 124 and, hence, only a fragmentary portion of the apparatus is illustrated. It is possible with the apparatus illustrated in FIG. 10 to secure an automatic regulation of the degree of vacuum or suction created within the dome 118 by employing an outlet valve of the ball-check type in lieu of the needle valve 128 shown in FIG. 7. It will be seen that a plurality of metal balls 156, such as ball bearings, may be disposed against the outlet port 126 which, under the circumstances, will comprise a ball seat. The balls 156 are retained in operative position by threaded closure member 158, the lower end of which is spaced above the balls 156 normally.

In operation of the embodiment shown in FIG. 10, the greater the pressure of the gaseous fluid introduced into the lubricator 34, the greater will be the suction produced upon gooseneck 116. Further, the more suction produced upon gooseneck 116, the greater will be the amount of oil discharged from said gooseneck into well 120 and from there down the suction tube 104. However, by selecting either one or a plurality of balls 156 of desired weight, particularly in accordance with the viscosity of the liquid lubricant, it is possible to effect an automatic adjustment of the suction within dome 118 and the corresponding feed of lubricant from gooseneck 116 so as to be in direct proportion to the amount of pressure of the gaseous fluid within lubricator 34. Such arrangement is effected due to the fact that the gaseous fluid under pressure within container 92 will act upon the lowermost ball 156, elevating the same from the seat 126 in accordance with the amount of pressure of the gaseous fluid. The greater the opening between the ball 156 and seat 126, the lesser will be the vacuum or reduced pressure within the dome 118. Correspondingly, the discharge of oil from the gooseneck 116 will be substantially equal to the lubricant which was discharged therefrom at lesser pressure within the container 92. Hence, the arrangement shown in FIG. 10 is effective to produce a substantially constant discharge of lubricant from the gooseneck 116 for atomization and introduction into the discharge gaseous fluid delivered to the turbine, even though pressures of the gaseous fluid within the lubricator 92 may vary within reasonable limits.

Notwithstanding the substantially automatic regulation of introduction of lubricant into the gaseous fluid by the arrangement shown in FIG. 10, as described above, the automatic operation of the balls 156 relative to the seat 126 may be limited to a maximum amount, if desired, by threading the closure member 158 downward so as to restrict the upward movement of the balls 156 to a predetermined amount. Under such circumstances, upon increase of pressure of the gaseous fluid within the lubricator, a corresponding increase in suction in the dome 118 will occur so as to furnish a greater supply of lubricant to the well 120 and suction tube 104 than will result from the operation of the structure when the balls 156 are permitted to operate in unrestrained manner as described in the preceding paragraph.

In the preferred form of both of the embodiments respectively shown in FIGS. 7 and 10, another ball-check valve 160 preferably is used adjacent the upper end of up-take 94 for the lubricant as shown in FIG. 7, it being understood that a similar structure is employed in the embodiment shown in FIG. 10. By the use of the ball-check valve 160, lubricant will not flow from the upper end of up-take 94 into the gooseneck 116 until a sufficient suction has been produced upon the lower end of suction tube 104 by the entering gaseous fluid flowing past the lower end thereof so as to effect a raising of the ball 160 from its seat. It has been found in practice in the exemplary lubricator constructions shown herein, that a pressure somewhere between 5 and 10 p.s.i. of gaseous fluid within the lubricator must be present before the ball 160 will commence to rise from its seat.

After operation of the unit shown in entirety in FIGS. 1 and 2 particularly, for a limited period of time, extraneous material filtered from the gaseous fluid passing through filter 24 will accumulate in the lower portion thereof. To permit the ready removal of any such accumulated material from the filter, the same is provided in the bottom thereof with a conventional spring pressed exhaust valve having a manually operable stem 162, see FIG. 2, projecting therefrom. It will be understood that the exhaust port through which the material is discharged surrounds said stem, for example, and when the valve is opened by pressing upwardly on the stem, the pressure of the gaseous fluid within the filter will serve to blow the extraneous material therefrom. Upon releasing the stem 162, the conventional spring embodied in the valve automatically will close it.

The basic features and advantages of the control unit described hereinabove also are attainable in a more simplified form, one exemplary embodiment of which is shown in FIG. 9. In the construction shown in said figure, the inlet conduit 164 from the supply of gaseous fluid under pressure is connected to the inlet end of solenoid-actuated inlet valve 166 which is mounted compactly in the lower end of casing 10. The solenoid 168 actuates a plunger 170, the right-hand end of which is engageable with the outlet of a valve nozzle 172 with which the inlet conduit 164 communicates. The nozzle 172 opens into a cavity 174 which communicates by port 176 with outlet nipple 178 threaded into the lower end of filter unit 180.

The diameter of the plunger 170 is smaller than the interior of the solenoid 168, whereby a passage 182 extends between the cavity 174 in the valve 166 and an outlet nipple 184. The outlet nipple 184 connects an exhaust tube 186 to valve 166, the outer end of the tube 186 preferably having any suitable sound muffling means such as metal gauze 188 connected to the outer end of tube 186. Further, inasmuch as there may be some liquid condensate exhausting from the filter 180, it is preferred that a suitable absorber 190, such as a piece of felt, be connected to the lower end of gauze 188 in order that any discharge condensate will not collect in the bottom of the casing 10.

It will be seen from the foregoing therefore that the line supply of gaseous fluid under pressure enters the filter through nipple 178 and passes through the interior of a central stem 192 which has an outlet port 194 therein. The gaseous fluid therefore enters the lower portion of the filter cavity in filter 180 so as to communicate with the exterior surface of the filter medium 196, passing therethrough and into a central tube 198 which has an inlet port 200 therein. The tube 198 of the filter does not communicate with the passage in the central stem 192 of the filter.

The head 202 of the filter has a valve seat 204 therein at the upper end of central tube 198, said seat receiving a ball valve member 206 engaged by a compression spring 208, the upper end of the spring being held under adjustable tension by a threaded shaft 210 having a thumb knob 212 on the upper end thereof which projects above the top of the casing 10.

It will be seen from the construction of the head that the valve comprising the ball 206 which operates relative to seat 204 will control the amount of pressure delivered to the outlet nipple 214 from the filter unit 180 within reasonably close limits, notwithstanding the fact that the pressure of gaseous fluid supplied by the inlet conduit 164 may vary from time to time within reasonable limits of the order, for example, of between 15 and 40 p.s.i.

In prior constructions of this type of air filter, the valve has consisted of a flat valve member seating over a hole. Turning the valve slightly would cause a very large change in the cross-sectional area of the passage blocked by the valve tending to provide very poor regulation. By the present invention which utilizes a spring biased ball 206, a slight turning of the valve control knob alters slightly the pressure of the spring, urging the ball into its seat 204 so that small increases in air pressure can be made. As indicated above, the spring also provides an automatic regulation of the air pressure by virtue of the fact that any increase in pressure is automatically made by increasing resistance in the spring which biases the ball 206 against its seat 204. Similarly, if pressure decreases, the spring expands and it is resistant to pressure decrease.

The amount of pressure delivered from the filter unit 180 readily may be determined by a pressure gauge 216 which is similar to the gauge 26 shown in FIGS. 1 and 2, the gauge 216 being connected between the filter unit 180 and the lubricator unit 34 shown in FIG. 9. It will be understood that the lubricator unit 34 in FIG. 9 is substantially the same as the unit shown in FIGS. 2, 6 and 7. If desired, the lubricator 34 shown in FIG. 9 may also include the embodiment of the details shown in FIG. 10, within the spririt of the invention.

One of the advantages of the embodiment of the control unit shown in FIG. 9 resides in the fact that automatic discharge of extraneous material removed from the gaseous fluid by the filter unit 180 takes place at the conclusion of each operation of the handpiece 48. This occurs by reason of the fact that when the handpiece is being operated, the solenoid-actuated inlet valve 166 will be energized by the control switch shown in FIG. 4 for example. The energizing of the solenoid 168 moves plunger 170 to the left so as to open inlet valve nozzle 172. Simultaneously, the left-hand end of plunger 170 abuts the inner end of outlet nipple 184 so as to close the passage 182 to atmosphere. The incoming gaseous fluid therefore passes through the valve nozzle 172 into port 176 and the filter unit 180. However, when the control switch is opened so as to stop the operation of the handpiece 48, the solenoid 168 immediately becomes de-energized, and a compression spring 216 which surrounds the right-hand end of plunger 170 operates immediately to force the right-hand end of the plunger against the valve nozzle 172 so as to close it against further delivery of gaseous fluid from inlet conduit 164 to the filter 180 and the other elements of the system which direct the fluid to the handpiece 48.

Immediately upon the plunger 170 being moved to close the valve nozzle 172, however, the interior of the filter unit 180 immediately will be connected to exhaust tube 186 through the communicating port 176, cavity 174 and passage 182. The gaseous fluid under pressure within the filter unit 180 therefore will act to blow any accumulated extraneous material within the lower portion of the filter unit 180 through said communicating passages and exhaust tube 186, whereby the same will be collected within the metal gauze 188. Under such circumstances, the pressure within the filter unit 180 will be, for example, of the order of between 20 and 30 pounds while the handpiece is being operated, and such amount of pressure will serve readily to discharge the accumulated extraneous material within the filter in the manner described above. Further, such immediate release of the pressure within the filter unit 180 likewise will facilitate stopping the operation of the handpiece when the control switch for the solenoid 168 is opened.

The embodiment of the invention shown in FIG. 9 also permits the use of a different type of mechanism to supply water to the handpiece 48, said mechanism being illustrated in full lines in FIG. 9. This mechanism includes a needle valve 218 which, for example, may be similar to that shown in FIG. 8. A manually operable knob 220 projects from the upper end thereof and the cover 222 of a sealed water container 224 is connected to the lower end of needle valve 218. Extending through cover 222 and sealed relative thereto is an outlet tube 226, to which a flexible conduit 228 is connected so as to extend to the handpiece 48. For convenience, the conduit 228 may be parallel to or even connected to the flexible delivery tube 28 which delivers the gaseous fluid to the handpiece.

When using the embodiment of water supply illustrated in full lines in FIG. 9, it is not necessary to have a solenoid actuated valve to control the same. For example, when the solenoid actuated inlet valve 166 is opened for purposes of driving the handpiece, gaseous fluid will not only be discharged from the head of the filter unit 202 into the supply system for the handpiece, but said gaseous fluid, under pressure, likewise will be directed into the top of the water container 224 when the needle valve 218 is opened to a desired, regulated amount. Placing the water within the container 224 under pressure will cause the same to be delivered through the flexible conduit 228 to the handpiece in accordance with the adjustment of the needle valve 218. If no water is desired during the operation of the handpiece, it is only necessary to close the needle valve 218, whereupon no water will be delivered to the handpiece.

The above described embodiment shown in FIG. 9 thus is suited for use on a portable control unit where it may not be conveniently possible to connect the same to a source of water supply but a source of gaseous fluid under pressure is available.

In lieu of using the water supply mechanism illustrated in full lines in FIG. 9, it is to be understood that the control unit shown in said figure may embody a water supply system shown in phantom in the figure and including solenoid-actuated water control valve 38, to which a water inlet conduit 36 and a water delivery conduit 46 are connected. It will be understood that under these circumstances, the water inlet conduit 36 will be connected to a suitable source of water supply, while a flexible tube leading to the handpiece will be connected to the outer end of water delivery conduit 46. The solenoid of the water control valve 38 also will be connected to the control switch 142 shown in FIG. 4 in accordance with the embodiment shown in FIGS. 1 and 2. Further, a needle valve 42 likewise will be directly connected to the water control valve 38, for convenience, rather than using the arrangement shown in FIG. 2.

From the foregoing, it will be seen that the present invention comprises a number of embodiments of a control unit for dental handpieces operable to supply gaseous fluid under regulated pressure conditions as required for predetermined speeds of a dental handpiece. The amount of pressure may be regulated precisely, whereby predetermined speed of the handpiece may be maintained. Further, all of the embodiments preferably employ filter units, whereby no appreciable extraneous material will be contained within the gaseous fluid delivered to the handpiece for driving the same. The pressure of the gaseous fluid delivered to the handpiece readily is observable by suitable indicating dials. Adequate lubricant likewise is introduced into the gaseous fluid by the control unit in order that the bearings of the handpiece will be lubricated satisfactorily and automatically. Various kinds of control valves are provided for purposes of regulating the amounts and pressures of the gaseous fluid delivered to the handpiece and regulating valves also are included in the elements of the control unit by which water is delivered selectively to the handpiece.

Conveniently operated and remotely located switch means are provided for controlling the operation of solenoid-actuated supply valves for both the gaseous fluid and water supplied to the handpiece. Several embodiments of water delivery arrangements are included, as are also several embodiments of lubricant delivery control mechanisms. In all, a maximum of convenience is afforded the operator of a dental handpiece by the several embodiments of control units illustrated and described herein, said units requiring a minimum amount of manual manipulation or adjustment. Cleaning of the accumulated extraneous material from the filter units likewise is provided by convenient means, one of which is automatically operable.

Referring to FIG. 11, there is shown a hanger for the handpiece which consists of a tube 302 having a washer 304 exposed intermediate the ends thereof. As shown in the drawing, the handpiece 306 rests on the washer 304 when located in the tube and the air hose 308 passes through the washer and out the lower end of the tube. The tube is mounted to a control unit 309 by brackets 310, the control unit normally being mounted adjacent a dental stand indicated at 311.

This arrangement holds the handpiece when it is not in use. The upper extremity of tube 302 is approximately at the same level as the patient's mouth, which would normally be approximately 4 feet from the ground whereby it holds the hose loop up above the patient when the handpiece is in use. The height of the upper extremity of the tube is such that when the handpiece is pulled out of the tube, the hose coming out of the tube will be suspended out of the way of the patient.

While the invention has been described and illustrated in its several preferred embodiments and has included certain details, it should be understood that the invention is not to be limited to the precise details herein illustrated and described since the same may be carried out in other ways falling within the scope of the invention as claimed.

I claim:

1. A control unit for a dental handpiece of the fluid turbine type and comprising in combination, a control valve connectable to a source of gaseous fluid and adjustable to deliver fluid at a desired predetermined pressure less than that fed to said valve, filter means connected to said control valve and operable to remove solid particles of extraneous matter from the fluid delivered to said valve, lubricating means operable to receive gaseous fluid at said predetermined pressure from said filter means and control valve and introduce a mist of lubricant within a desired range of proportions for delivery to the turbine of a dental handpiece with said gaseous fluid to drive the rotor and lubricate the bearings thereof, conduits connecting the aforementioned means and control valve to each other, and a delivery valve interconnected to the inlet of fluid to said lubricating means and operable at will be the operator to control the passage of gaseous fluid through said control unit to said handpiece.

2. A control unit for a dental handpiece of the fluid turbine type and comprising in combination, a control valve connectable to a source of gaseous fluid and adjustable to deliver fluid at a desired predetermined pressure less than that fed to said valve, filter means connected to said control valve and operable to remove solid particles of extraneous matter from the fluid delivered to said valve, lubricating means operable to receive gaseous fluid at said predetermined pressure from said filter means and control valve and introduce a mist of lubricant within a desired range of proportions for delivery to the turbine of a dental handpiece with said gaseous fluid to drive the rotor and lubricate the bearings thereof, conduits connecting the aforementioned means and control valve to each other, a pressure indicator with visible dial connected to the delivery outlet of said control valve, and a delivery valve interconnected to the inlet of fluid to said lubricating means and operable at will by the operator to control the passage of gaseous fluid through said control unit to said handpiece.

3. A control unit for a dental handpiece of the fluid turbine type and comprising in combination, a control valve connectable to a source of gaseous fluid and adjustable to deliver fluid at a desired predetermined pressure less than that fed to said valve, filter means connected to said control valve and operable to remove solid particles of extraneous matter from the fluid delivered to said valve, lubricating means operable to receive gaseous fluid at said predetermined pressure from said filter means and control valve and introduce a mist of lubricant within a desired range of proportions for delivery to the turbine of a dental handpiece with said gaseous fluid to drive the rotor and lubricate the bearings thereof, conduits connecting the aforementioned means and control valve to each other, a solenoid-actuated delivery valve interconnected to the inlet of fluid to said lubricating means, and a switch remotely connected electrically between a source of current and the solenoid of said delivery valve and operable at will by the operator remotely from the handpiece to control the passage of gaseous fluid through said control unit to said handpiece.

4. A control unit for a dental handpiece of the fluid turbine type and comprising in combination, a control valve conectable to a source of gaseous fluid and adjustable to deliver fluid at a desired predetermined pressure less than that fed to said valve, filter means connected to said control valve and operable to remove solid particles of extraneous matter from the fluid delivered to said valve, lubricating means having a reservoir for liquid lubricant and operable to receive gaseous fluid at said predetermined pressure from said filter means and control valve and introduce a mist of lubricant within a desired range of proportions for delivery to the turbine of a dental handpiece with said gaseous fluid to drive the rotor and lubricate the bearings thereof, said lubricating means having lubricant atomizing means and the lubricant reservoir thereof communicating with the gaseous fluid introduced thereto under pressure, whereby the pressure of said gaseous fluid causes feed of lubricant to said atomizing means, conduits connecting the aforementioned means and control valve to each other, and a delivery valve interconnected to the inlet of fluid to said lubricating means and operable at will by the operator to control the passage of gaseous fluid through said control unit.

5. The control unit according to claim 1 further characterized by said filter means including a filter medium through which the gaseous fluid passes inwardly from the exterior, whereby extraneous matter filtered from the fluid may drop from the exterior of said filter medium, an enclosure surrounding and extending below said filter medium to confine the gaseous fluid introduced under pressure to said filter means and receive accumulated extraneous material in the bottom thereof, and a manually actuated discharge valve in the bottom of said enclosure openable at will to permit gaseous fluid under pressure within said filter means to blow said accumulated extraneous material through said valve for removal thereof from said filter means.

6. The control unit according to claim 1 further characterized by said control valve comprising a housing having inlet and outlet ports and a passage therebetween having a valve seat therein, a valve member reciprocable axially relative to said seat between open and closed positions, means forming a chamber adjacent one end of said valve member, a diaphragm extending across said chamber and connected to said valve member, one surface of said diaphragm communicating with the outlet port of said housing and an adjustable pressure spring interengaging the other surface of said diaphragm, the diaphragm being of substantially greater area than said valve member, whereby said spring may be adjusted to cause said valve member to be opened an amount to discharge fluid from said control valve at a predetermined desired amount uniformly and the fluid pressure demanded by the handpiece acts against said diaphragm in opposition to said pressure spring to actuate said valve member suitably to deliver fluid at said predetermined pressure for which said spring has been adjusted.

7. A control unit for a dental handpiece of the fluid turbine type and having a water spray jet to deliver water to a bur in the handpiece, said unit comprising in combination, a control valve connectable to a source of gaseous fluid and adjustable to deliver fluid at a desired predetermined pressure less than that fed to said valve, filter means connected to said control valve and operable to remove solid particles of extraneous matter from the fluid delivered to said valve, lubricating means operable to receive gaseous fluid at said predetermined pressure from said filter means and control valve and introduce lubricant within a desired range of proportions for delivery to the turbine of a dental handpiece with said gaseous fluid to drive the rotor and lubricate the bearings thereof, conduits connecting the aforementioned means and control valve to each other, a solenoid-actuated delivery valve interconnected to the inlet of fluid to said lubricating means and operable at will by the operator to control the passage of gaseous fluid through said control unit, a switch electrically connected to said solenoid valve, a conduit for water leading from said unit to a handpiece and also to a source of supply, a second solenoid-actuated valve in said unit connected in said water conduit, and switch means electrically connected to the solenoid of said second valve and operable commonly with the switch of said first mentioned solenoid-actuated valve, whereby gaseous fluid and water may be furnished simultaneously to said handpiece.

8. A control unit for a dental handpiece of the fluid turbine type and having a water spray jet to deliver water to a bur in the handpiece, said unit comprising in combination, a control valve connectable to a source of gaseous fluid and adjustable to deliver fluid at a desired predetermined pressure less than that fed to said valve, filter means connected to said control valve and operable to remove solid particles of extraneous matter from the fluid delivered to said valve, lubricating means operable to receive gaseous fluid at said predetermined pressure from said filter means and control valve and introduce lubricant within a desired range of proportions for delivery to the turbine of a dental handpiece with said gaseous fluid to drive the rotor and lubricate the bearings thereof, conduits connecting the aforementioned means and control valve to each other, a solenoid-actuated delivery valve interconnected to the inlet of fluid to said lubricating means and operable at will by the operator to control the passage of gaseous fluid through said control unit, a switch electrically connected to said solenoid valve, a conduit for water leading from said unit to a handpiece and also to a source of supply, a second solenoid-actuated valve in said unit connected in said water conduit, switch means electrically connected to the solenoid of said second valve, and switch actuating means connected commonly to both of said switches and operable to actuate said valves simultaneously, whereby gaseous fluid and water may be furnished simultaneously to said handpiece.

9. A control unit for a dental handpiece of the fluid turbine type and having a water spray jet to deliver water to a bur in the handpiece, said unit comprising in combination, a control valve connectable to a source of gaseous fluid and adjustable to deliver fluid at a desired predetermined pressure less than that fed to said valve, filter means connected to said control valve and operable to remove solid particles of extraneous matter from the fluid delivered to said valve, lubricating means operable to receive gaseous fluid at said predetermined pressure from said filter means and control valve and introduce lubricant within a desired range of proportions for delivery to the turbine of a dental handpiece with said gaseous fluid to drive the rotor and lubricate the bearings thereof, conduits connecting the aforementioned means and control valve to each other, a solenoid-actuated delivery valve interconnected to the inlet of fluid to said lubricating means and operable at will by the operator to control the passage of gaseous fluid through said control unit, a switch electrically connected to said solenoid valve, a conduit for water leading from said unit to a handpiece and also to a source of supply, a second solenoid-actuated valve in said unit connected in said water conduit, switch means electrically connected to the solenoid of said second valve, and a switch actuating member movably mounted and carrying switch closing means which first move to close the switch of said first mentioned solenoid, and continued movement of said member moves switch closing means to close the switch of the solenoid of said second valve, whereby gaseous fluid and water may be furnished in succession to said handpiece.

10. A control unit for a dental handpiece of the fluid turbine type and having a water spray jet to deliver water to a bur in the handpiece, said unit comprising in combination, a control valve connectable to a source of gaseous fluid and adjustable to deliver fluid at a desired predetermined pressure less than that fed to said valve, filter means connected to said control valve and operable to remove solid particles of extraneous matter from the fluid delivered to said valve, lubricating means operable to receive gaseous fluid at said predetermined pressure from said filter means and control valve and introduce lubricant within a desired range of proportions for delivery to the turbine of a dental handpiece with said gaseous fluid to drive the rotor and lubricate the bearings thereof, conduits connecting the aforementioned means and control valve to each other, a solenoid-actuated delivery valve interconnected to the inlet of fluid to said lubricating means and operable at will by the operator to control the passage of gaseous fluid through said control unit, a switch electrically connected to said solenoid valve, a conduit for water leading from said unit to a handpiece and also to a source of supply, an adjustable valve in said conduit operable manually to regulate the maximum flow of water therethrough, a second solenoid-actuated valve in said unit connected in said water conduit, and switch means electrically connected to the solenoid of said second valve and operable commonly with the switch of said first mentioned solenoid-actuated valve, whereby gaseous fluid and water may be furnished simultaneously to said handpiece.

11. A control unit for a dental handpiece of the fluid turbine type comprising in combination, a delivery valve connectable to a source of gaseous fluid under pressure, filter means including a casing the lower end of which is connected to the delivery end of said delivery valve, a pressure control valve connected to the upper end of said filter means and operable to control the pressure of gaseous fluid discharged from said filter means to a predetermined amount less than the pressure of the fluid entering said filter means, and lubricating means connected to the outlet of said pressure control valve and operable to introduce liquid lubricant into the gaseous fluid, said lubricating means having outlet means for the lubricant-entrained gaseous fluid for delivery thereof to a dental hand-piece to drive the rotor and lubricate the bearings thereof.

12. A control unit for a dental handpiece of the fluid turbine type comprising in combination, a delivery valve connectable to a source of gaseous fluid under pressure, filter means including a casing the lower end of which is connected to the delivery end of said delivery valve, a pressure control valve connected to the upper end of said filter means and operable to control the pressure of gaseous fluid discharged from said filter means to a predetermined amount less than the pressure of the fluid entering said filter means, and exhaust means on said delivery valve operable when said valve is closed to communicate with the interior of said filter, whereby accumulated extraneous material in said filter means is discharged automatically therefrom by the exhaustion of the gaseous fluid under pressure within said filter means when said delivery valve is closed following operation of the handpiece by pressure delievered thereto from said pressure control valve.

13. A control unit for a dental handpiece of the fluid turbine type and comprising in combination, filter means connectable to receive gaseous fluid from a source thereof and operable to remove solid particles of extraneous matter from the fluid delivered to said filter, a control valve arranged relative to said filter means and adjustable to regulate the delivery of fluid from said filter means at a predetermined amount, lubricating means operable to receive gaseous fluid at said predetermined pressure from said filter means and introduce lubricant at a desired proportion to the gaseous fluid for delivery to the turbine of a dental handpiece to drive the rotor and lubricate the bearings thereof, said lubricating means including lubricant flow control means responsive to the pressure of the gaseous fluid delivered to said lubricator and operable automatically to introduce lubricant into said gaseous fluid at a substantially constant rate notwithstanding variations in the pressure of said gaseous fluid, conduits connecting the aforementioned means and control valve to each other, and a delivery valve interconnected to the inlet of said lubricating means and operable at will by the operator to control the passage of gaseous fluid through said control unit to a dental handpiece connected thereto.

14. A control unit for a dental handpiece of the fluid turbine type and comprising in combination, filter means connectable to receive gaseous fluid from a source thereof and operable to remove solid particles of extraneous matter from the fluid delivered to said filter, a control valve arranged relative to said filter means and adjustable to regulate the delivery of fluid from said filter means at a predetermined amount, lubricating means operable to receive gaseous fluid at said predetermined pressure from said filter means and introduce lubricant at a desired proportion to the gaseous fluid for delivery to the turbine of a dental handpiece to drive the rotor and lubricate the bearings thereof, said lubricating means including lubricant flow control means responsive to the pressure of the gaseous fluid delivered to said lubricator and operable automatically to produce suction upon said lubricant directly in proportion to said fluid pressure to progressively deliver lubricant to aspirating means, said flow control means also including pressure responsive means operable automatically to counteract said suction force, whereby said lubricator introduces lubricant into said gaseous fluid at a substantially constant rate notwithstanding variations in the pressure of said gaseous fluid, conduits connecting the aforementioned means and control valve to each other, and a delivery valve interconnected to the inlet of said lubricating means and operable at will by the operator to control the passage of gaseous fluid through said control unit to a dental handpiece connected thereto.

15. A control unit for a dental handpiece of the fluid turbine type comprising in combination, filter means for gaseous fluid including a casing, a delievery valve connectable to a source of gaseous fluid under pressure and also connected to the lower end of the casing of said filter means, a pressure control valve connected to the upper end of said filter means and operable to control the pressure of gaseous fluid discharged from said filter means to a predetermined amount which is less than the pressure thereof entering said filter means, lubricating means connected to the outlet of said pressure control valve and operable to introduce liquid lubricant into the gaseous fluid, said lubricating means having outlet means for the lubricant-entrained gaseous fluid for delivery thereof to a dental handpiece to drive the rotor and lubricate the bearings thereof, an enclosed container for water connected at the upper end thereof to the outlet of said pressure control valve, a water outlet tube extending into said container from the upper end thereof, and a flow control valve connected between said pressure control valve and the interior of said container, whereby when said flow control valve is open gaseous fluid from said pressure control valve exerts pressure upon water within said container and forces water therefrom through said water outlet tube, said water outlet tube being connectable to a dental handpiece to deliver water to a bur therein while operating.

16. In a system for supplying fluid under pressure having an air filter having an inlet port and an outlet port and a solenoid operated valve at the inlet to said filter, the improvement comprising means forming a bypass passageway communicating between the low pressure side of said valve and atmosphere, said valve having a first position in which said bypass passageway is blocked and said fluid is permitted to pass into said filter, said valve having a second position in which said passage of fluid into said filter is blocked and fluid in the filter is permitted to drain to atmosphere, said valve normally being urged to said second position, and being urged to said first position upon energization of said solenoid, whereby when said valve assumes said second position fluid and debris accumulating in said filter will be expelled to atmosphere.

References Cited in the file of this patent

UNITED STATES PATENTS

| | | |
|---|---|---|
| 2,061,013 | Wade | Nov. 17, 1936 |
| 2,214,774 | Pieper | Sept. 17, 1940 |
| 2,214,775 | Pieper | Sept. 17, 1940 |
| 2,303,458 | Hermann et al. | Dec. 1, 1942 |
| 2,318,721 | Siver | May 11, 1943 |
| 2,532,054 | Broussard et al. | Nov. 28, 1950 |
| 2,613,067 | Goodyer | Oct. 7, 1952 |
| 2,661,537 | Angell | Dec. 8, 1953 |
| 2,696,049 | Black | Dec. 7, 1954 |
| 2,855,672 | Franwick et al. | Oct. 14, 1958 |
| 2,902,762 | Madsen | Sept. 8, 1959 |